(12) United States Patent
Chen

(10) Patent No.: US 11,988,944 B1
(45) Date of Patent: May 21, 2024

(54) FOLDABLE SOFT BOX UMBRELLA TRAY AND SOFT BOX

(71) Applicant: WENZHOU JIEBAO TECHNOLOGY CO.,LTD., Wenzhou (CN)

(72) Inventor: Qingyuan Chen, Wenzhou (CN)

(73) Assignee: WENZHOU JIEBAO TECHNOLOGY CO., LTD., Wenzhou (CN)

( * ) Notice: Subject to any disclaimer, the term of this patent is extended or adjusted under 35 U.S.C. 154(b) by 0 days.

(21) Appl. No.: 18/536,588

(22) Filed: Dec. 12, 2023

(30) Foreign Application Priority Data

Mar. 28, 2023 (CN) .......................... 202320667518.5

(51) Int. Cl.
| | |
|---|---|
| *G03B 15/06* | (2021.01) |
| *F21V 1/06* | (2006.01) |
| *F21V 17/00* | (2006.01) |
| *G03B 15/04* | (2021.01) |

(52) U.S. Cl.
CPC ................ *G03B 15/06* (2013.01); *F21V 1/06* (2013.01); *F21V 17/007* (2013.01); *G03B 15/0484* (2013.01)

(58) Field of Classification Search
CPC ................ G03B 15/06; G03B 15/0484; G03B 2215/0525; F21V 1/06; F21V 17/007
See application file for complete search history.

(56) References Cited

U.S. PATENT DOCUMENTS

| | | | |
|---|---|---|---|
| 11,409,187 B2 * | 8/2022 | Kim ........................ | G03B 15/06 |
| 11,719,999 B1 * | 8/2023 | Chen ...................... | G03B 15/06 |
| | | | 362/16 |
| 2019/0377242 A1 * | 12/2019 | Boerup .................. | G03B 15/06 |

* cited by examiner

*Primary Examiner* — Alan B Cariaso
(74) *Attorney, Agent, or Firm* — Daniel M. Cohn; Howard M. Cohn

(57) ABSTRACT

A foldable soft box umbrella tray and soft box, comprising an annular base which is able to be connected to a light source and comprises a first body with a support rod jack and a second body; a movable disc body movably connected to the annular base via a switching mechanism and provided with the support rod jack, wherein the switching mechanism comprises a first cross arm and a second cross arm movably connected to the first body and the movable disc body respectively, and a connecting shaft, and the connecting shaft passes through the first cross arm and the second cross arm and is rotatably connected thereto; and the movable disc body is able to rotate between a contracted position and a working position, and in the working position, the movable disc body and the second body lie in a same plane.

10 Claims, 7 Drawing Sheets

FOLDABLE SOFT BOX UMBRELLA TRAY AND SOFT BOX

TECHNICAL FIELD

The present disclosure relates to the technical field of photographic auxiliary equipment, and particularly relates to a foldable soft box umbrella tray and soft box.

BACKGROUND ART

The soft light box is installed on a film lamp, so that the light emitted by the film lamp is more soft, and spots and shadows on the photograph can be eliminated when shooting. The soft light boxes on the market are mostly umbrella-shaped structures with open ends, and the open ends are used for connecting an external light source. When the soft light box is contracted, a plurality of support members are folded on a periphery of the open ends in a circular ring shape. Since the outer diameter of the open ends in the circular ring shape is relatively large, even in a folded state, the support members form a gap in a circumferential circle at a position close to the open ends, and a contracted volume is relatively large, which is inconvenient to carry and transport.

In response to the above-mentioned problems, a folding type soft light box is available on the market, which can fold the umbrella disc of the soft light box into a semi-circular structure, but the folding structure thereof is relatively complicated, and an unfolded structure thereof is not stable enough.

SUMMARY OF THE INVENTION

In order to overcome the deficiencies of the prior art, the present disclosure provides a foldable soft box umbrella tray and soft box with a small volume of a folding structure of the umbrella disc, which is convenient for folding and accommodating the soft light box.

The technical solution adopted by the present disclosure to solve the technical problem thereof is a foldable soft box umbrella tray and soft box, including an annular base which is able to be connected to a light source and includes a first body (11) with a support rod jack and a second body which is spliced with the first body to form a ring;

a movable disc body movably connected to the annular base via a switching mechanism and provided with the support rod jack, wherein the switching mechanism includes a first cross arm and a second cross arm movably connected to the first body and the movable disc body respectively, and a connecting shaft, and the connecting shaft passes through the first cross arm and the second cross arm and is rotatably connected thereto; and the movable disc body is able to rotate between a contracted position and a working position, and in the working position, the movable disc body and the second body lie in a same plane.

The present disclosure uses the rotation of the movable disc body relative to the annular base for it to be able to be unfolded to radially overlap with the second body and to be contracted to vertically overlap with the first body, and when it is in a contracted position, the support rod and the soft light cloth of the soft light box can be folded at one side of the first body, so that the flexible light box is folded to be flat when being contracted, and compared with a state where the umbrella disc and the support rod are in a three-dimensional state when being folded, the space occupied by contraction is greatly reduced, which is convenient for transportation and carrying. The annular base is in the shape of a complete ring, and the movable disc body is rotatably connected to the annular base, and when the soft light box is in the working position, the overall structure is relatively stable.

Further, the first body has a first abutting end face, the movable disc body has a second abutting end face, the first abutting end face and the second abutting end face are fitted together in the working position, and the first cross arm and the second cross arm are hidden in the first body and the movable disc body. When the umbrella disc of the present disclosure is unfolded, the first cross arm and the second cross arm are hidden in the first body and the movable disc body, and there is no structure protruding from the surface of the first body and the movable disc body, so that the risk of light leakage is avoided, and shadows are not generated, and the soft light effect is better. The volume of the first cross arm, the second cross arm and the connecting shaft is small, the matching structure is stable, and can be replaced, so as to extend the overall service life of the umbrella disc. The first cross arm, the second cross arm and the connecting shaft are hidden inside the first body and the movable disc body in the unfolded state, so as to achieve a fall-resistant and wear-resistant effect.

Further, the first cross arm is movably connected to the first body via a first guide shaft and is rotatably connected to the movable disc body via a first switching shaft; and the second cross arm is movably connected to the movable disc body via a second guide shaft and is rotatably connected to the first body via a second switching shaft.

Further, a first stroke groove for rolling of the first guide shaft is formed in the first body, and a second stroke groove for rolling of the second guide shaft is formed in the movable disc body; the first cross arm has a first noumenon, a first protrusion and a first extension located at two ends of the first noumenon, the connecting shaft is provided on the first noumenon, the first guide shaft is provided on the first protrusion, and the first switching shaft is provided on the first extension; the second cross arm has a second noumenon, a second protrusion and a second extension located at two ends of the second noumenon, the connecting shaft is provided on the second noumenon, the second guide shaft is provided on the second protrusion, and the second switching shaft is provided on the second extension. The first guide shaft rolls in the first stroke groove, and the second guide shaft rolls in the second stroke groove, so that the movable connection between the first cross arm and the first body is realized, and the movable connection between the second cross arm and the movable disc body is realized, and the stroke groove limits a rolling range of the guide shaft, and the structures in the unfolded and folded states are relatively stable. The structure design of the first cross arm and the second cross arm is reasonable, and on the premise of ensuring smooth rotation, both the first body and the movable disc are hidden inside when they are unfolded, and the part exposed when the first body and the movable disc are folded is small in volume. The first cross arm and the second cross arm have less contact friction with the first body and the movable disc body, and the service life of the umbrella disc is long.

Further, a groove one for accommodating the first protrusion and a slot one for accommodating the second extension are formed in the first body, the groove one and the slot one are in communication and are open at the first abutting end face; a groove two for accommodating the second protrusion and a slot two for accommodating the first extension are formed in the movable disc body, the groove two and the slot two are in communication and are open at the second abutting end face, and are in opposition to the slot one; a junction of the first protrusion and the first body forms a first recessed groove for accommodating the second switching shaft. The first recessed groove can prevent the second switching shaft from interfering with the first cross arm, and ensure that the first guide shaft can smoothly roll in the first stroke groove.

Further, the connecting shaft is provided in a radial direction of the first body or the movable disc body; the first cross arm has a first plane, the second cross arm has a second plane, the first plane being able to abut against the first body and the second plane being able to abut against the movable disc body when the first body and the movable disc body are unfolded; a quantity of the first cross arm(s) and/or the second cross arm(s) is two or more, the first cross arm(s) and the second cross arm(s) are provided alternately, and side faces of the first cross arm(s) and the second cross arm(s) abut with each other. The first plane plays a good supporting role on the first body and the second plane plays a good supporting role on the movable disc body, and the overall structure is more stable. A plurality of first cross arms and second cross arms are used in concert, with greater overall strength and rotational stability.

Further, the umbrella disc of a folding soft light box further includes a locking unit configured for locking or unlocking between the movable disc body and the second body, the locking unit including a locking member elastically connected to the second body, a toggle member connected to the locking member, and a limit card slot provided on the movable disc body, wherein the locking member is able to extend into the limit card slot so as to lock the second body and the movable disc body; the second body is provided with a sliding groove extending in a radial direction, an elastic member is connected in the sliding groove, and the locking member is connected to the elastic member; an end of the locking member forms a guide surface which extends obliquely from inside outwards in a direction of rotation, close to the second body, of the movable disc body. The locking member radially achieves the locking of the second body and the movable disc body, and stably maintains the movable disc body in the working position; the cooperation between the sliding groove and the elastic piece enables the movable path of the locking memeber to be relatively determined, and also facilitates the locking and unlocking operations; the arrangement of the guide surface enables the locking member to automatically fall into the limit card slot during the rotation of the movable disc body, so that the operation is more convenient.

Further, the annular base is of an annular shape, the first body is semi-circular or nearly semi-circular, and the movable disc body is semi-circular or nearly semi-circular; a maximum outer diameter of the second body is smaller than a minimum outer diameter of the first body; and an inner side wall of the movable disc body is able to be concavo-convexly embedded with the second body. The first body, the second body and the movable disc body are all in a semi-circular shape or nearly a semi-circular shape, the folded and accommodated structure is more flat, and the forces are relatively balanced everywhere when unfolded and used; the outer diameter of the second body is smaller than the outer diameter of the first body, so that when the movable disc is unfolded to the working position, the difference between the outer diameter of the part where the movable disc is located and the outer diameter of the first body is not too large, and an inner end of the support rod jack can also be ensured to be located on a circle with the same radius; the movable disc and the second body are concavo-convexly embedded, and the mating structure of the two is more stable.

Further, the second body is detachably connected to a stopper which is able to abut against the movable disc body to limit a rotary stroke of the movable disc body. The stopper axially locks the second body and the movable disc body to prevent excessive rotation of the movable disc body.

The present disclosure also discloses a soft light box, including the umbrella disc described above, a plurality of support rods, and a soft light cloth, the support rod including a ball head support leg and a support rod body, wherein the first body and the movable disc body are circumferentially provided with a ball head groove for clamping the ball head support leg and a movable groove in communication with the ball head groove, the movable groove is flared, and a groove wall of a flared portion of the movable groove gradually increases from a position radially corresponding to the ball head groove.

The beneficial effects of the present disclosure are that, by using the rotation of the movable disc body relative to the annular base, it can be unfolded to radially overlap with the second body, and can be contracted to vertically overlap with the first body, and the soft light box folds to a flat shape when being contracted, so that the space occupied by contraction is reduced, and it is convenient for transportation and carrying. The annular base is in a complete ring shape, and the movable disc body is rotatably connected to the annular base. When the soft light box is in a working position, the overall structure is relatively stable, and the forces are relatively balanced everywhere. When unfolded, the first cross arm and the second cross arm are hidden in the first body and the movable disc body, and there is no structure protruding the surface of the first body and the movable disc body, so that the risk of light leakage is avoided, and shadows are not generated, and the soft light effect is better. The volume of the first cross arm, the second cross arm and the connecting shaft is small, the cooperation structure is stable, and can be replaced, so as to extend the overall service life of the umbrella disc. The support rod cannot easily switch from the unfolded state to the collapsed state; labor is saved when the support rod is switched from the collapsed state to the unfolded state.

Figure 1:
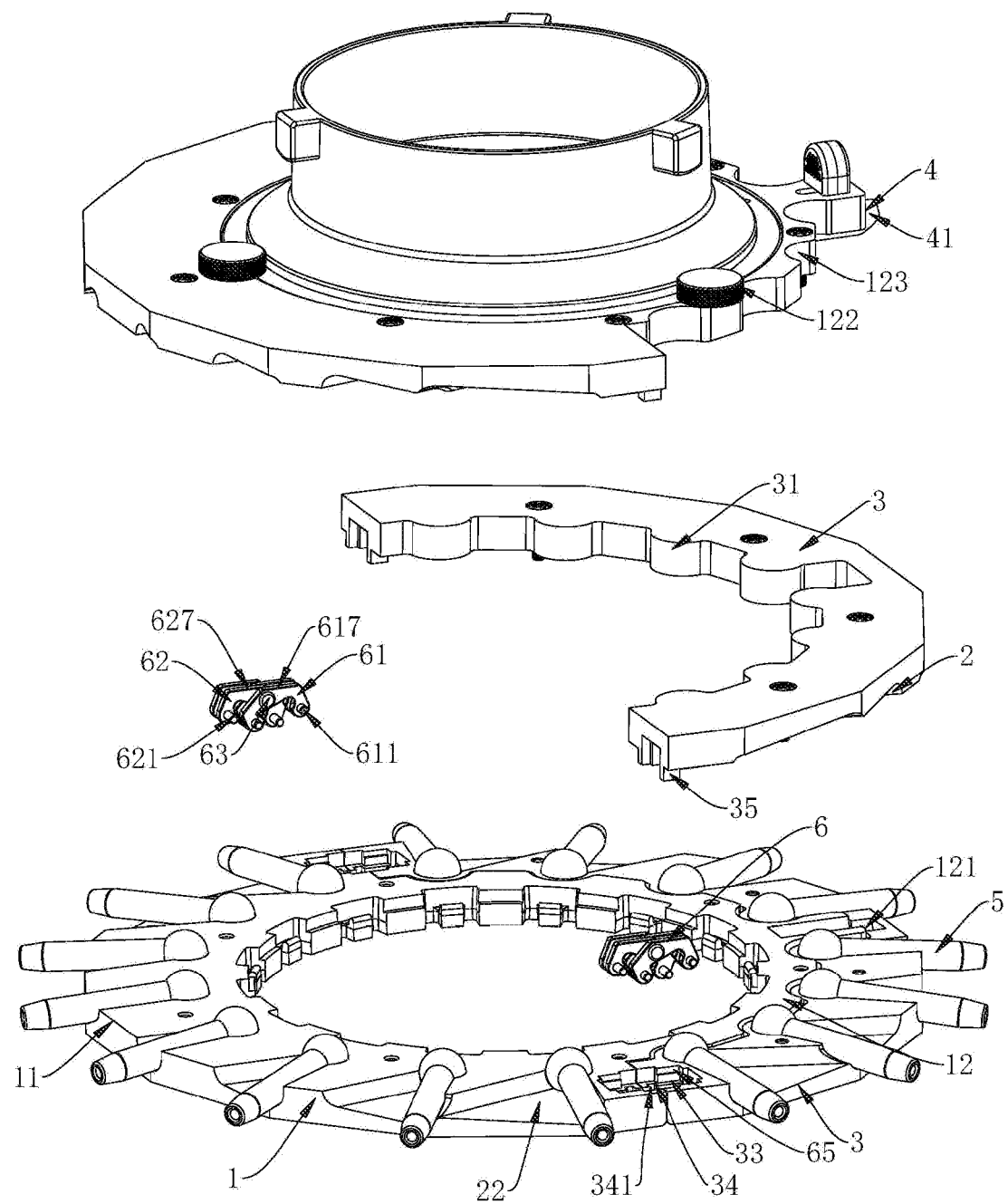
FIG. 1 is an exploded schematic structural diagram of the present disclosure.
Figure 2:
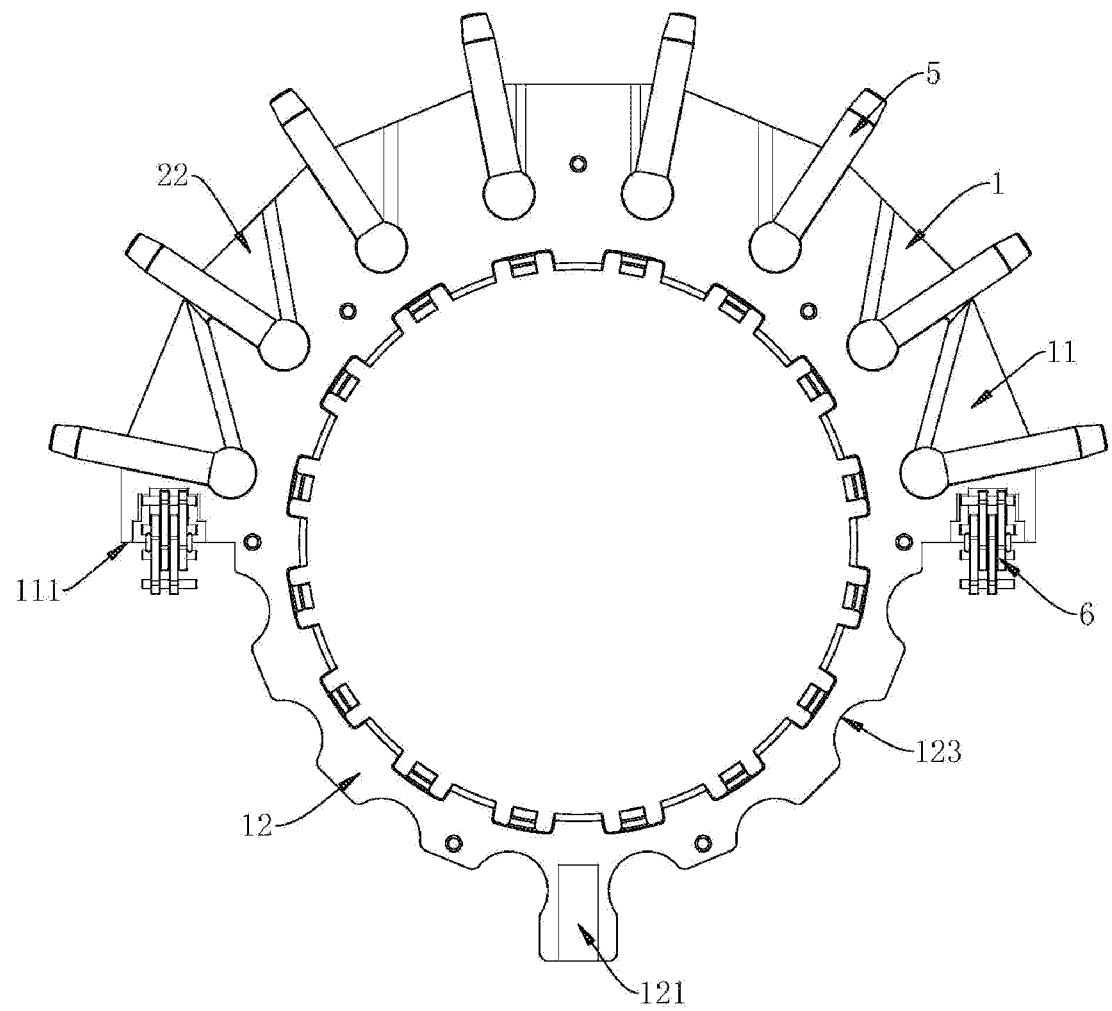
FIG. 2 is a schematic structural diagram of partial cooperation of an annular structure and a switching structure of the present disclosure.
Figure 3:
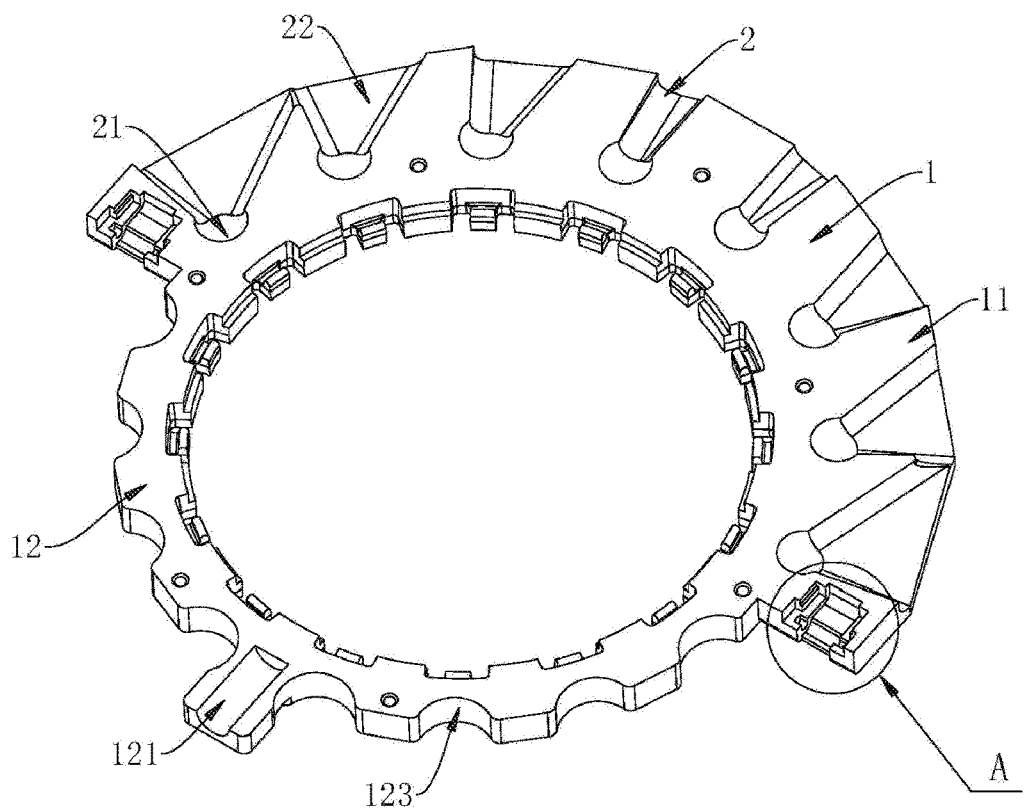
FIG. 3 is a partial schematic structural diagram I of the annular structure of the present disclosure.
Figure 4:
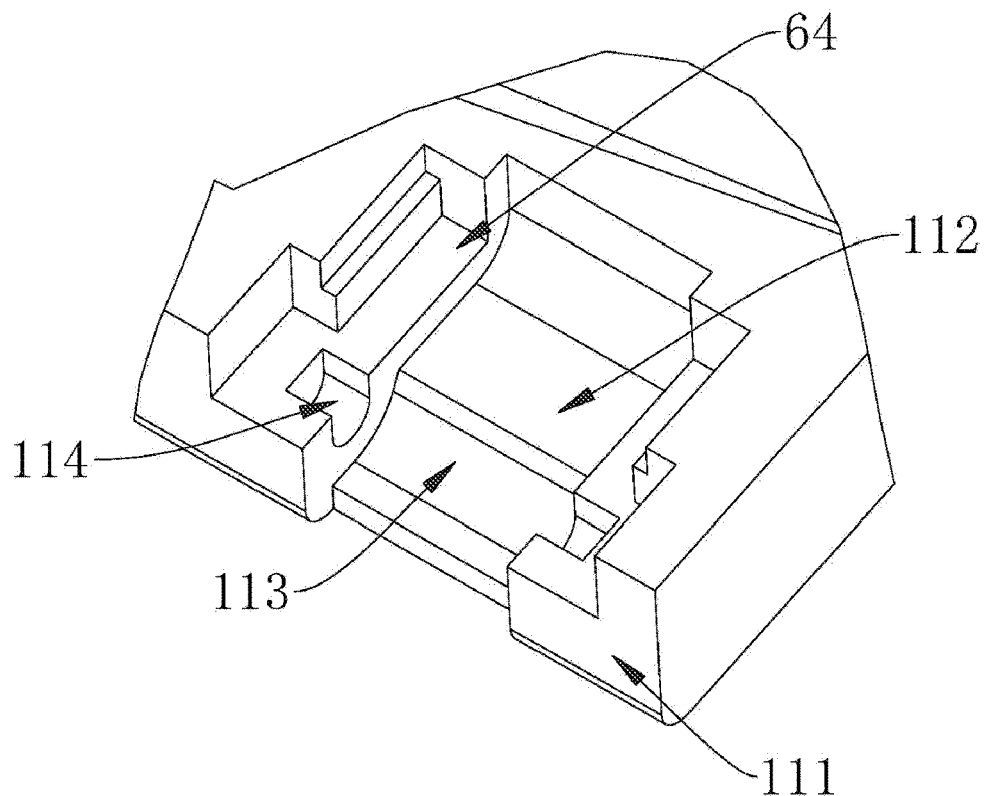
FIG. 4 is an enlarged structural diagram of A in FIG. 3.
Figure 5:
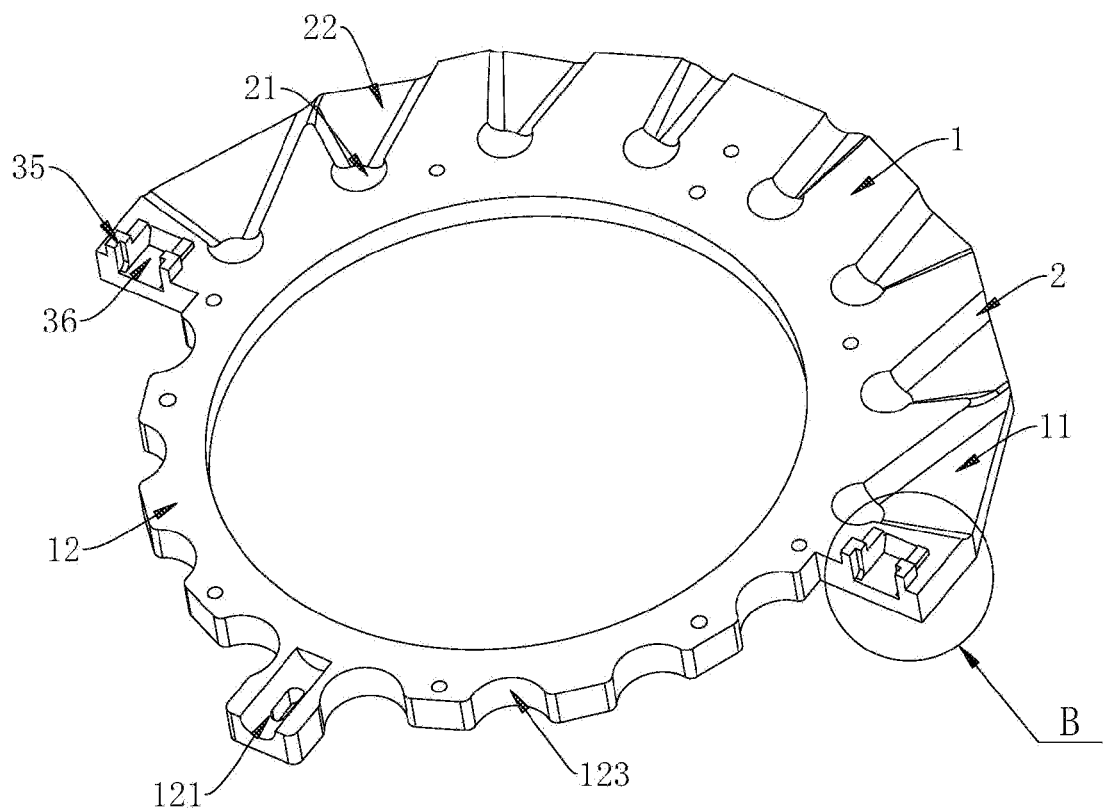
FIG. 5 is a partial schematic structural diagram II of the annular structure of the present disclosure.
Figure 6:
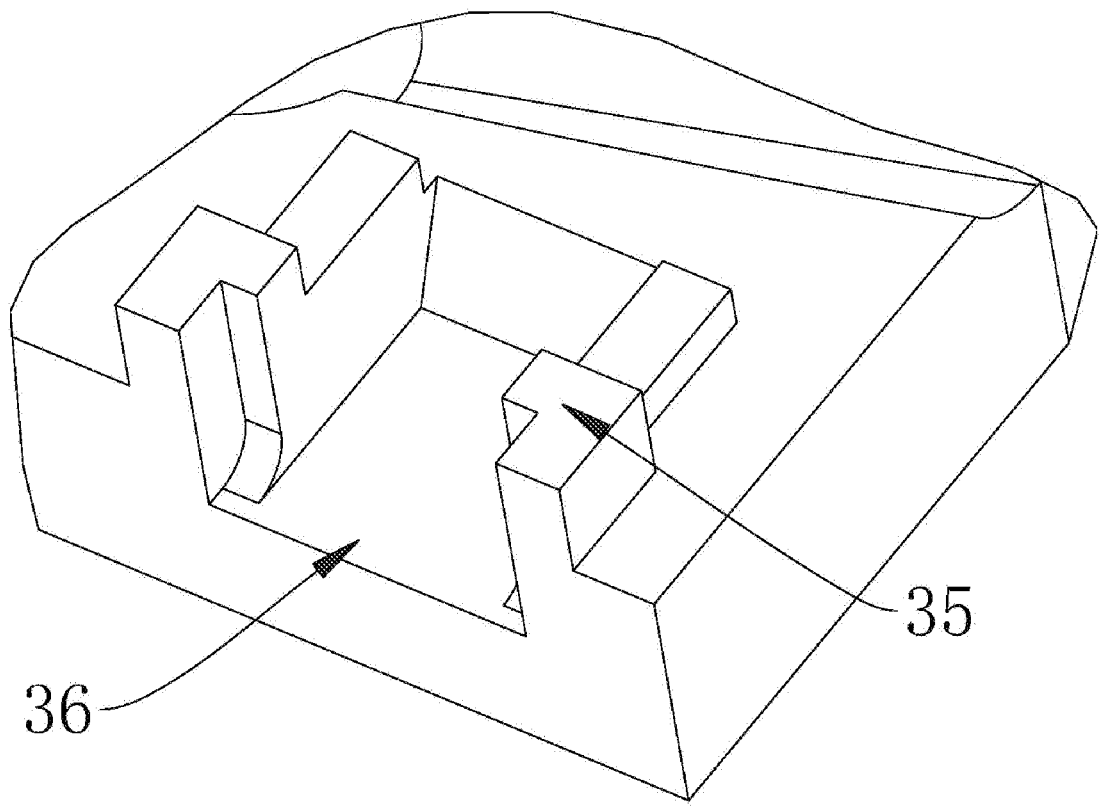
FIG. 6 is an enlarged structural diagram of B in FIG. 5.
Figure 7:
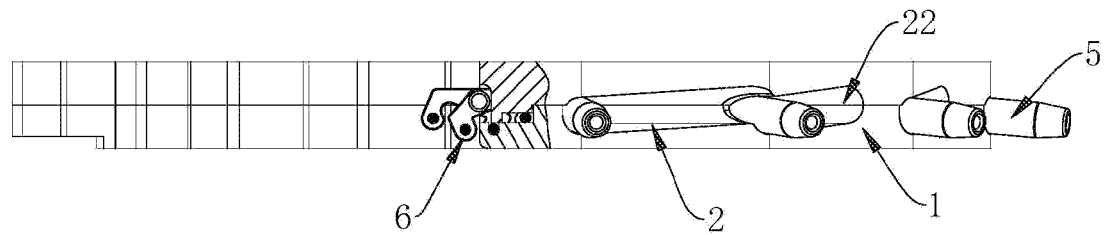
FIG. 7 is a partial schematic structural diagram of the present disclosure in a working position.

1—annular base, 11—first body, 111—first abutting end face, 112—groove one, 113—slot one, 114—second mounting hole, 12—second body, 121—sliding groove, 122—stopper, 123—arc depression, 2—support rod jack, 21—ball head groove, 22—movable groove, 3—movable disc body, 31—arc protrusion, 32—second abutting end face, 33—groove two, 34—slot two, 341—first mounting hole, 35—pressure holding part, 36—expansion groove, 4—locking unit, 41—locking member, 411—guide face, 412—mounting slot hole, 42—toggle member, 43—elastic member, 5—ball head support leg, 6—switching mechanism, 61—first cross arm, 611—first guide shaft, 612—first switching shaft, 613—first body, 614—first protrusion, 615—first extension, 616—first recessed groove, 617—first plane, 62—second cross arm, 621—second guide shaft, 622—second switching shaft, 623—second body, 624—second protrusion, 625—second extension, 627—second plane, 63—connecting shaft, 64—first stroke groove, 65—second stroke groove.

DETAILED DESCRIPTION OF THE INVENTION

In order that the person skilled in the art would better understand the technical solution of the present disclosure, the embodiments of the present utlity model will now be described more clearly and fully hereinafter with reference to the accompanying drawings, in which embodiments of the present disclosure are shown. It is to be understood that the embodiments described are only a few, but not all embodiments of the present disclosure Based on the embodiments of the present disclosure, all other embodiments obtained by a person of ordinary skill in the art without inventive effort fall within the scope of the present disclosure.

As shown in FIGS. 1-12, an umbrella disc of a folding soft light box includes an annular base 1 connectable to a light source, a movable disc body 3 rotatably connected to the annular base 1 by a switching mechanism 6, and a locking unit 4.

The annular base 1 includes a first body 11 having a support rod jack 2 and a second body 12 integrally connected to the first body 11. In the present embodiment, the first body 11 has a semi-circular shape or a nearly semi-circular shape, the second body 12 has a semi-circular shape or a nearly semi-circular shape, and the first body 11 and the second body 12 are integrally connected and located a the same plane, and are spliced to form the ring-shaped annular base 1. Inner diameters of the circle in which the first body 11 and the second body 12 are located are approximately equal, and a maximum outer diameter of the second body 12 is smaller than a minimum outer diameter of the first body 11. In other words, the outer diameter of the second body 12 is smaller than the outer diameter of the first body 11. In order to facilitate the assembly, the annular base 1 may be composed of two parts that are spliced up and down, which is achieved in the prior art and will not be described in detail.

The first body 11 is provided with the support rod jack 2, but the second body 12 is not provided with the support rod jack 2, and the movable disc body 3 is provided with the support rod jack 2. The movable disc body 3 is rotatably connected to the first body 11, and the two are cooperatively connected via an switching mechanism 6. The movable disc body 3 has a semi-circular shape or a nearly semi-circular shape, a central angle of which is approximately equal to that of the second body 12, and the switching mechanism 6 includes a first cross arm 61 movably connected to the first body 11 and the movable disc body 3 respectively, a second cross arm 62 movably connected to the movable disc body 3 and the first body 11 respectively, and a connecting shaft 63. In the present embodiment, the first body 11 has a first abutting end face 111 at its open end, and the movable disc body 3 is also semi-circular and has a second abutting end face 32 at its open end. The connecting shaft 63 passes through and is rotatably connected to the first cross arm 61 and the second cross arm 62. When the first body 11 and the movable disc body 3 are unfolded to a same horizontal plane, the first abutting end face 111 and the second abutting end face 32 abut, and at the same time, the first cross arm 61 and the second cross arm 62 are hidden inside the first body 11 and the movable disc body 3. In other words, when the first body 11 and the movable disc body 3 are unfolded to form a complete circle, the first cross arm 61 and the second cross arm 62 are not visible on the outside. Of course, in other embodiments, the first body 11 and the movable disc body 3 may be assembled to form a square ring, without being limited.

Figure 11:
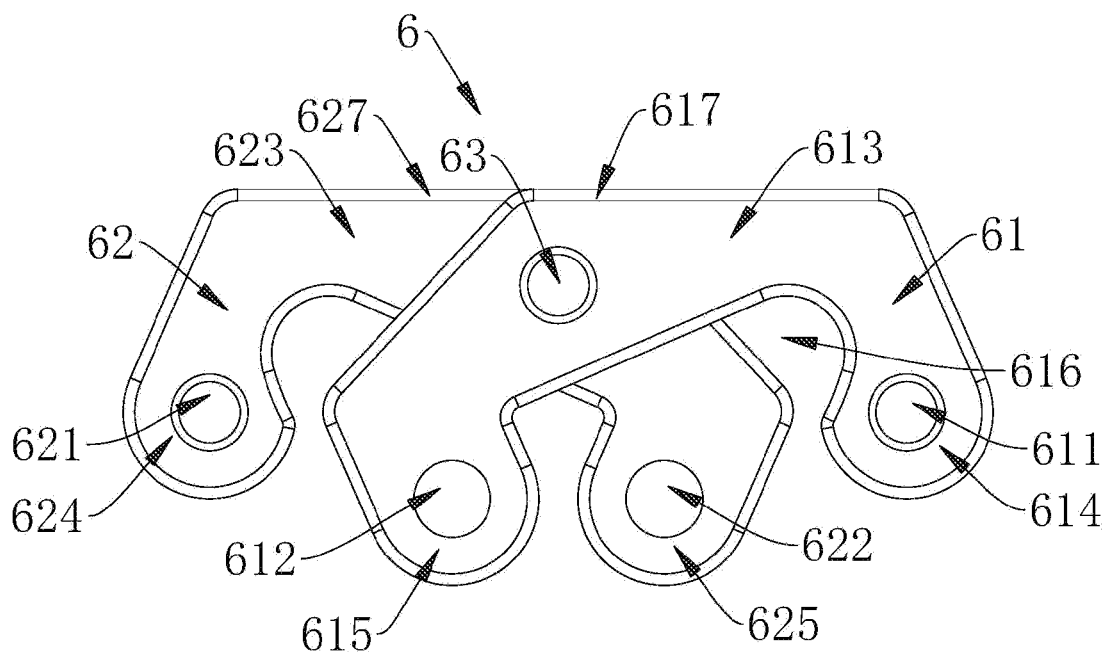
FIG. 11 is a front view of a first cross arm and a second cross arm connected via a connecting shaft in the present disclosure, in which case a first body and a movable disc body are in a unfolded state.
Figure 12:
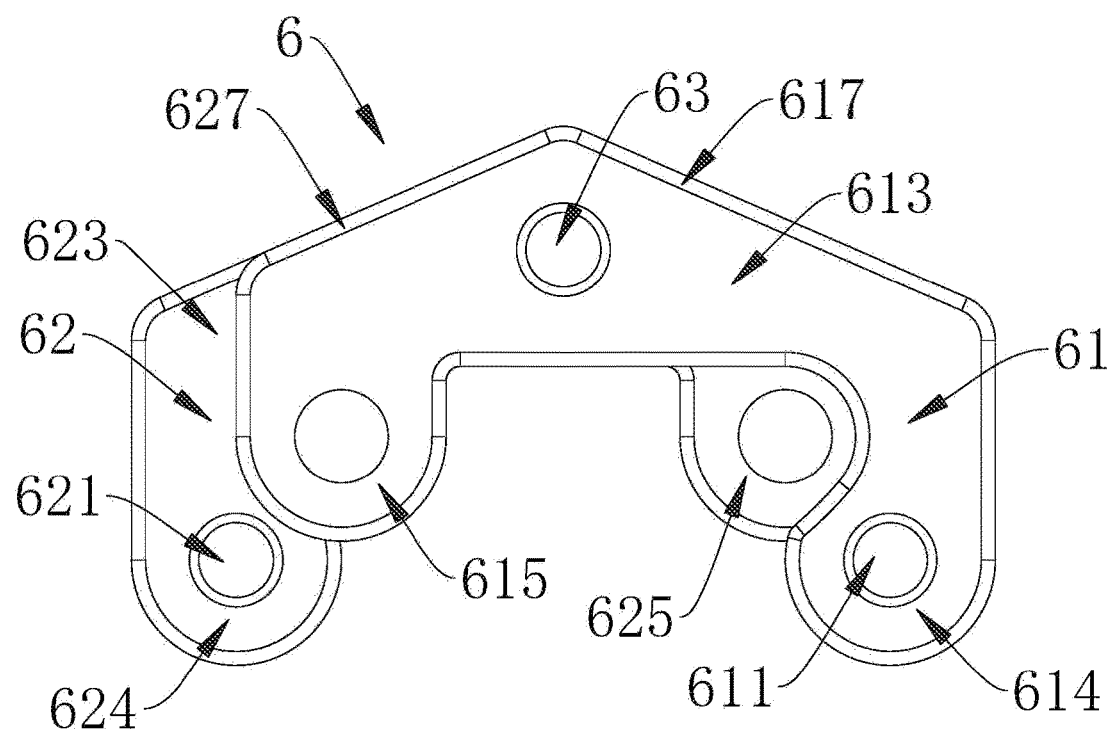
FIG. 12 is a front view of the first cross arm and the second cross arm connected via the connecting shaft in the present disclosure, in which case the first body and the movable disc body are in a folding state.

As shown in FIGS. 11 and 12, the first cross arm 61 has a first noumenon 613, a first protrusion 614 and a first extension 615 located at two ends of the first noumenon 613, wherein the first protrusion 614 and the first extension 615 are located on a same side of the first noumenon 613, the above-mentioned connecting shaft 63 is provided on the first noumenon 613, the first protrusion 614 is provided with a first guide shaft 611, and the first extension 615 is provided with a first switching shaft 612. Specifically, the connecting shaft 63 may be penetratingly provided on the first noumenon 613 and relatively movable, the first guide shaft 611 may be penetratingly provided on the first protrusion 614 and relatively movable, and the first switching shaft 612 may be penetratingly provided on the first extension 615 and relatively movable.

The second cross arm 62 has a second noumenon 623, a second protrusion 624 and a second extension 625 located at two ends of the second noumenon 623, wherein the second protrusion 624 and the second extension 625 are located on a same side of the second noumenon 623, the above-mentioned connecting shaft 63 is provided on the second noumenon 623, the second protrusion 624 is provided with a second guide shaft 621, and the second extension 625 is provided with a second switching shaft 622. Specifically, the connecting shaft 63 may be penetratingly provided on the second noumenon 623 and relatively movable, the second guide shaft 621 may be penetratingly provided on the second protrusion 624 and relatively movable, and the second switching shaft 622 may be penetratingly provided on the second extension 625 and relatively movable.

The structure of the second cross arm 62 is the same as that of the first cross arm 61, but the arrangement directions of the two are opposite, namely, the first protrusion 614 and the second protrusion 624 are respectively located on two sides of the connecting shaft 63.

The first cross arm 61 is movably connected to the first body 11 via a first guide shaft 611 and rotatably connected to the movable disc body 3 via a first switching shaft 612. Specifically, a first stroke groove 64 in which the first guide shaft 611 rolls is formed in the first body 11. The first body 11 is formed with a groove one 112 for accommodating the first protrusion 614 and a slot one 113 for accommodating the second extension 625, two side walls of the slot one 113 are formed with a second mounting hole 114 into which the second switching shaft 622 extends, the groove one 112 communicates with the slot one 113, a depth of the slot one 113 is greater than a depth of the groove one 112, and the slot one 113 is open at the first abutting end face 111. In other words, a portion of the first abutting end face 111 is hollowed out.

The second cross arm 62 is movably connected to the movable disc body 3 via a second guide shaft 621 and rotatably connected to the first body 11 via a second switching shaft 622. Specifically, a second stroke groove 65 in which the second guide shaft 621 rolls is formed in the movable disc body 3. A groove two 33 and a slot two 34 are formed in the movable disc body 3, the groove two 33 is used for accommodating the second protrusion 624, the slot two 34 is used for accommodating the first extension 615, two side walls of the slot two 34 form a first mounting hole 341 into which the first switching shaft 612 extends, the groove two 33 is in communication with the slot two 34, a depth of the slot two 34 is greater than a depth of the groove two 33, and the slot two 34 is open at the second abutting end face 32. In other words, a portion of the second abutting end face 32 is hollowed out, and the slot two 34 is in opposition to the slot one 113.

In order to prevent the second switching shaft 622 from interfering with the first cross arm 61, a first recessed groove 616 is formed at a junction of the first protrusion 614 and the first noumenon 613, which can be used to receive the second switching shaft 622, ensuring that the first guide shaft 611 can smoothly roll in the first stroke groove 64.

Likewise, in order to prevent the first switching shaft 612 from interfering with the second cross arm 62, a second recessed groove is formed at a junction of the second protrusion 624 and the second noumenon 623, which can be used to receive the first switching shaft 612, ensuring that the second guide shaft 621 can smoothly roll in the second stroke groove 65.

In the present embodiment, the first cross arm 61 and the second cross arm 62 have a flat sheet shape, and the quantity thereof is two for both, the first cross arm 61 and the second cross arm 62 are arranged alternately, and side surfaces of the first cross arm 61 and the second cross arm 62 are attached to each other. Of course, in other embodiments, the quanity of first cross arms 61 and second cross arms 62 may be arbitrarily selected and is not particularly limited.

Figure 10:
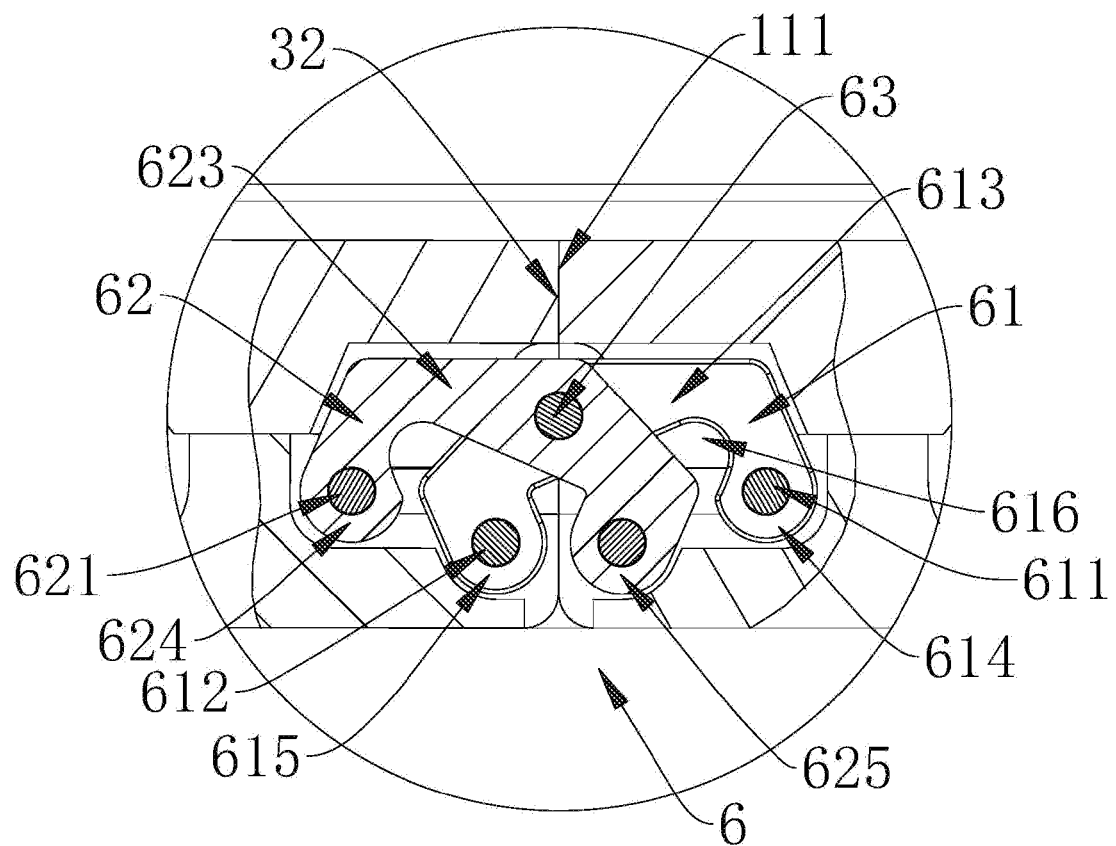
FIG. 10 is an enlarged structural diagram of C in FIG. 9.

After the assembly is completed, the connecting shaft 63 is disposed along a radial direction of the first body 11 or the movable disc body 3. As shown in FIGS. 10 and 11, the first cross arm 61 has a first plane 617, the second cross arm 62 has a second plane 627, and when the first body 11 and the movable disc body 3 are unfolded to lie on a same horizontal plane, the first plane 617 can abut against an inner wall of the first body 11, and the second plane 627 can abut against an inner wall of the movable disc body 3, so as to play a good supporting role.

Figure 8:
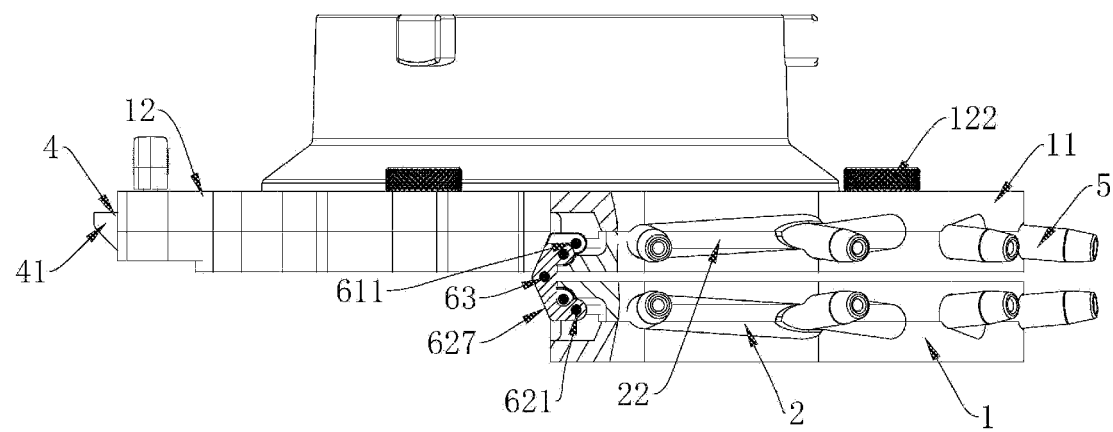
FIG. 8 is a schematic structural diagram of the present disclosure in a contracted position.

A connection line of an axis where the connecting shaft 63 is located, an axis where the first guide shaft 611 is located and an axis where the first switching shaft 612 is located is triangular. As shown in FIG. 8, when the first body 11 and the movable disc body 3 are vertically folded, portions of the first cross arm 61 and the second cross arm 62 and the connecting shaft 63 are located outside, and remaining portions are hidden inside the first body 11 and the movable disc body 3.

In order to facilitate assembly, both the first body 11 and the movable disc body 3 are formed by splicing upper and lower parts, and in order to ensure the movable stability of the first guide shaft 611 and the second guide shaft 621, a pressure holding part 35 is provided on a lower surface of the upper part of both the first body 11 and the movable disc body 3, and the pressure holding part 35 can extend into the first stroke groove 64 or the second stroke groove 65. In order to expand a volume of the groove body, an expansion groove 36 is further provided between the two pressure holding parts 35 which is in vertical opposition with the groove two 33 and the slot two 34 or in vertical opposition with the groove one 112 and the slot one 113.

As shown in FIG. 10, when the first body 11 and the movable disc body 3 are in an unfolded state, the first guide shaft 611 is located at an end of the first stroke groove 64 which is the end away from the movable disc body 3 with the first plane 617 facing horizontally upwards; the second guide shaft 621 is located at an end of the second stroke groove 65 which is the end away from the first body 11, with the second flat surface 627 facing horizontally upward.

As shown in FIG. 8, when the first body 11 and the movable disc body 3 are in a contracted state of being folded up and down, the first guide shaft 611 rolls to the other end of the first stroke groove 64 with the first plane 617 facing outwards; the second guide shaft 621 rolls to the other end of the second stroke groove 65 with the second plane 627 facing outward.

Figure 9:
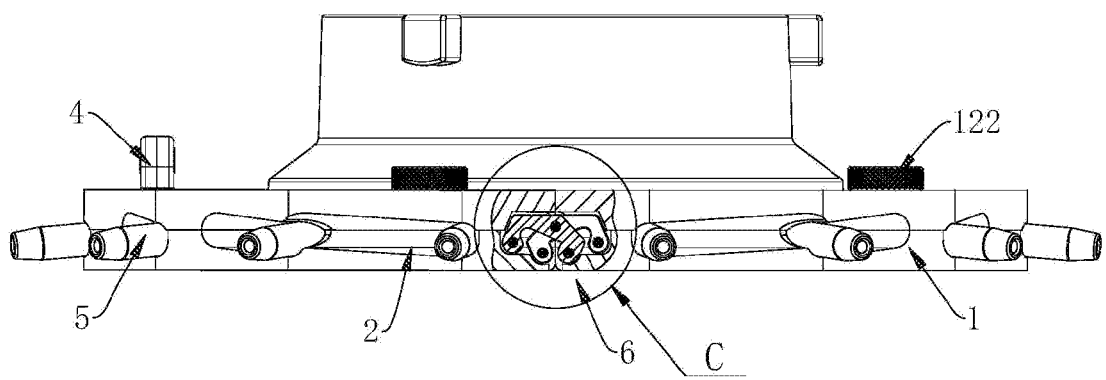
FIG. 9 is a schematic structural diagram of the present disclosure in the working position.

The locking unit 4 serves to lock or unlock between the movable disc body 3 and the second body 12. The movable disc body 3 has at least a contracted position where it is rotated such that the first body 11 is folded vertically and a working position where it is rotated such that the second body 12 is folded radially, as shown in FIG. 9. When the locking unit 4 locks the movable disc body 3 and the second body 12 in the working position, it may be a radial locking, an axial locking, or a simultaneous radial locking and axial locking (here, taking the direction shown in FIG. 9 as an example, the radial direction is the radial direction of the annular base 1, namely, the transverse direction, and the axial direction is the central axial direction of the annular base 1, namely, the vertical direction).

Figure 13:
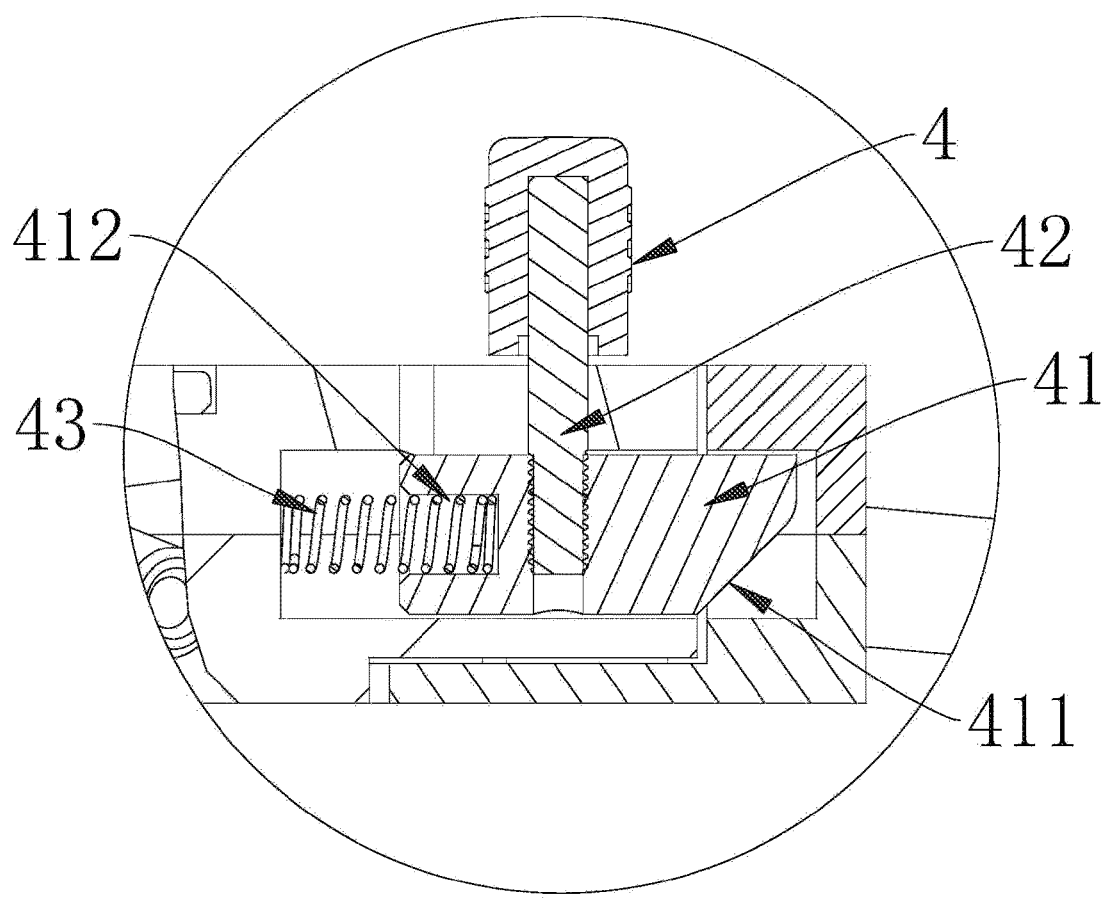
FIG. 13 is a sectional schematic structural diagram of a locking unit of the present disclosure.

As shown in FIG. 13, the locking unit 4 includes a locking member 41 elastically connected to the second body 12, a toggle member 42 connected to the locking member 41, and a limit card slot 33 provided on the movable disc body 3, wherein the locking member 41 can extend into the limit card slot 33, thereby achieving radial locking of the second body 12 and the movable disc body 3. Specifically, the second body 12 is provided with a sliding groove 121 extending in a radial direction, an opening of the sliding groove 121 faces radially outward, an elastic member 43 is connected in the sliding groove 121, and one end of the locking member 41 is connected to the elastic member 43. More specifically, the elastic member 43 is a spring, and an end of the locking member 41 is provided with a mounting slot hole 412 into which a portion of the elastic member 43 extends.

In order to enable the locking member 41 to smoothly fall into the limit card slot 33 when the movable disc body 3 is rotated from the contracted position to the working position, i.e. when the movable disc body 3 is rotated counterclockwise to a horizontal position, a guide surface 411 is formed at an end of the locking member 41 and extends obliquely from inside to outside in a direction of rotation, close to the second body 12, of the movable disc body 3, i.e. obliquely from the inside to the outside from the bottom to the top in FIG. 13.

The toggle member 42 is threaded on the locking member 41 and extends perpendicularly from the surface of the second body 12, so that when unlocking is required, the locking member 41 can be disengaged from the movable disc body 3 by applying an external force on the toggle member 42 to move the locking member 41 away from the limit card slot 33, thereby achieving unlocking.

The radial locking of the second body 12 and the movable disc body 3 is achieved for the locking unit 4, and a stopper 122 is detachably connected to the second body 12, which can abut against the movable disc body 3, thereby limiting the rotational stroke of the movable disc body 3. In other words, as shown in FIG. 9, the stopper 122 prevents the movable disc body 3 from continuing to rotate upward, and achieves axial limiting of the movable disc body 3 and the second body 12.

The inner side wall of the movable disc body 3 may be concavo-convexly engaged with the outer side wall of the second body 12, in other words, an arc protrusion 31 is formed on the inner side wall of the movable disc body 3 and a arc depression 123 is formed on the outer side wall of the second body 12, and the arc protrusion 31 and the arc depression 123 are sized and shaped to fit.

In use, the movable disc body 3 is unfolded to lie on the same horizontal plane as the second body 12, and during the rotation of the movable disc body 3, the locking member 41 gradually falls into the limit card slot 33 to achieve the radial locking of the movable disc body 3 and the annular base 1, and at the same time, the stopper 122 is connected to the second body 12 to limit the movable disc body 3 from continuing to rotate upwards above. In the working position, the movable disc body 3 and the second body 12 and the first body 11 are on the same horizontal plane, namely, the movable disc body 3 and the second body 12 are radially overlapped, and inner ends of the support rod jacks 2 are all located on a circle with the same radius, as shown in FIG. 1.

When storage is required, an external force is applied to the locking unit 4 to release the locking between the movable disc body 3 and the first body 11, and the movable disc body 3 is rotated counterclockwise so as to be folded under the first body 11, as shown in FIG. 8, and the lower surface of the first body 11 and the lower surface of the movable disc body 3 are fitted together at the time of folding, instead of the folding in which there is a gap between the two.

A soft light box includes the above-mentioned umbrella disc, a plurality of support rods (not shown in the figures), and a soft light cloth (not shown in the figures), wherein the support rod includes a ball head support leg 5 and a support rod body, the first body 11 and the movable disc body 3 are circumferentially arranged with a ball head groove 21, and a movable groove 22 communicating with the ball head groove 21, and the ball head support leg 5 is clamped in the ball head groove 21. In particular, the end of the ball head support leg 5 has a spherical structure, the axially extending portion of which is used for inserting a support rod, and the shape and size of the ball head groove 21 are adapted to the ball head support leg 5. The movable groove 22 is flared, and a groove wall of a flared portion of the movable groove 22 gradually increases from a position radially corresponding to the ball head groove 21. In other words, a depth of the movable groove 22 is not equal everywhere, but gradually decreases from the ball head groove 21, namely, a wall thickness of a bottom wall of the ball head groove 21 gradually thickens from the ball head groove 21.

Of course, in other embodiments, the ball head support leg 5 and the support rod body may be of one-piece construction.

When the soft light cloth is unfolded, the ball head support leg 5 is located in the ball head groove 21. Taking the horizontal placement of the annular base 1 as an example, since a horizontal height of the movable groove 22 is greater than a horizontal height of the ball head groove 21, the ball head support leg 5 will not freely leave the ball head groove 21 under the supporting force of the soft light cloth.

When the soft cloth is folded, the ball head support leg 5 is separated from the ball head groove 21, and moves in the movable groove 22, and the movable disc body 3 rotates to overlap with the first body 11, and the soft cloth is folded on the side where the first body 11 is located.

The above-mentioned detailed description is intended to illustrate the present disclosure, not to limit the present disclosure, and any modifications and changes made to the present disclosure within the spirit and scope of protection of the claims of the present disclosure fall within the scope of the present disclosure.

The invention claimed is:

1. A foldable soft box umbrella tray, comprising:
   an annular base (1) which is able to be connected to a light source and comprises a first body (11) with a support rod jack (2) and a second body (12) which is spliced with the first body (11) to form a ring;
   a movable disc body (3) movably connected to the annular base (1) via a switching mechanism (6) and provided with the support rod jack (2), wherein
   the switching mechanism (6) comprises a first cross arm (61) and a second cross arm (62) movably connected to the first body (11) and the movable disc body (3) respectively, and a connecting shaft (63), and the connecting shaft (63) passes through the first cross arm (61) and the second cross arm (62) and is rotatably connected thereto; and
   the movable disc body (3) is able to rotate between a contracted position and a working position, and in the working position, the movable disc body (3) and the second body (12) lie in a same plane.

2. The foldable soft box umbrella tray according to claim 1, wherein the first body (11) has a first abutting end face (111), the movable disc body (3) has a second abutting end face (32), the first abutting end face (111) and the second abutting end face (32) are fitted together in the working position, and the first cross arm (61) and the second cross arm (62) are hidden in the first body (11) and the movable disc body (3).

3. The foldable soft box umbrella tray according to claim 2, wherein the first cross arm (61) is movably connected to the first body (11) via a first guide shaft (611) and is rotatably connected to the movable disc body (3) via a first switching shaft (612); and the second cross arm (62) is movably connected to the movable disc body (3) via a second guide shaft (621) and is rotatably connected to the first body (11) via a second switching shaft (622).

4. The foldable soft box umbrella tray according to claim 3, wherein a first stroke groove (64) for rolling of the first guide shaft (611) is formed in the first body (11), and a second stroke groove (65) for rolling of the second guide shaft (621) is formed in the movable disc body (3); the first cross arm (61) has a first noumenon (613), a first protrusion (614) and a first extension (615) located at two ends of the first noumenon (613), the connecting shaft (63) is provided on the first noumenon (613), the first guide shaft (611) is provided on the first protrusion (614), and the first switching shaft (612) is provided on the first extension (615); the second cross arm (62) has a second noumenon (623), a second protrusion (624) and a second extension (625) located at two ends of the second noumenon (623), the connecting shaft (63) is provided on the second noumenon (623), the second guide shaft (621) is provided on the second protrusion (624), and the second switching shaft (622) is provided on the second extension (625).

5. The foldable soft box umbrella tray according to claim 4, wherein a groove one (112) for accommodating the first protrusion (614) and a slot one (113) for accommodating the second extension (625) are formed in the first body (11), the groove one (112) and the slot one (113) are in communication and are open at the first abutting end face (111); a groove two (33) for accommodating the second protrusion (624) and a slot two (34) for accommodating the first extension (615) are formed in the movable disc body (3), the groove two (33) and the slot two (34) are in communication and are open at the second abutting end face (32), and are in opposition to the slot one (113); a junction of the first protrusion (614) and the first body (613) forms a first recessed groove (616) for accommodating the second switching shaft (622).

6. The foldable soft box umbrella tray according to claim 1, wherein the connecting shaft (63) is provided in a radial direction of the first body (11) or the movable disc body (3); the first cross arm (61) has a first plane (617), the second cross arm (62) has a second plane (627), the first plane (617) being able to abut against the first body (11) and the second plane (627) being able to abut against the movable disc body (3) when the first body (11) and the movable disc body (3) are unfolded; a quantity of the first cross arm(s) (61) and/or the second cross arm(s) (62) is two or more, the first cross arm(s) (61) and the second cross arm(s) (62) are provided alternately, and side faces of the first cross arm(s) (61) and the second cross arm(s) (62) abut with each other.

7. The foldable soft box umbrella tray according to claim 1, further comprising a locking unit (4) configured for locking or unlocking between the movable disc body (3) and the second body (12), the locking unit (4) comprising a locking member (41) elastically connected to the second body (12), a toggle member (42) connected to the locking member (41), and a limit card slot provided on the movable disc body (3), wherein the locking member (41) is able to extend into the limit card slot so as to lock the second body (12) and the movable disc body (3); the second body (12) is provided with a sliding groove (121) extending in a radial direction, an elastic member (43) is connected in the sliding groove (121), and the locking member (41) is connected to the elastic member (43); an end of the locking member (41) forms a guide surface (411) which extends obliquely from inside outwards in a direction of rotation, close to the second body (12), of the movable disc body (3).

8. The foldable soft box umbrella tray according to claim 1, wherein the annular base (1) is of an annular shape, the first body (11) is semi-circular or nearly semi-circular, and the movable disc body (3) is semi-circular or nearly semi-circular; a maximum outer diameter of the second body (12) is smaller than a minimum outer diameter of the first body (11); and an inner side wall of the movable disc body (3) is able to be concavo-convexly embedded with the second body (12).

9. The foldable soft box umbrella tray according to claim 1, wherein the second body (12) is detachably connected to a stopper (122) which is able to abut against the movable disc body (3) to limit a rotary stroke of the movable disc body (3).

10. A soft box, comprising the umbrella tray according to claim 1, a plurality of support rods, and a soft light cloth, the support rod comprising a ball head support leg (5) and a support rod body, wherein the first body (11) and the movable disc body (3) are circumferentially provided with a ball head groove (21) for clamping the ball head support leg (5) and a movable groove (22) in communication with the ball head groove (21), the movable groove (22) is flared, and a groove wall of a flared portion of the movable groove (22) gradually increases from a position radially corresponding to the ball head groove (21).

\* \* \* \* \*